United States Patent [19]

Fadavi-Ardekani et al.

[11] Patent Number: 5,928,317
[45] Date of Patent: Jul. 27, 1999

[54] FAST CONVERTER FOR LEFT-TO-RIGHT CARRY-FREE MULTIPLIER

[75] Inventors: Jalil Fadavi-Ardekani, Orefield; Ravi Kumar Kolagotla, Breinigsville; Hosahalli R. Srinivas, Allentown, all of Pa.

[73] Assignee: Lucent Technologies Inc., Murray Hill, N.J.

[21] Appl. No.: 08/850,982

[22] Filed: May 5, 1997

Related U.S. Application Data

[60] Provisional application No. 60/034,130, Dec. 31, 1996.

[51] Int. Cl.$^6$ ........................................... G06F 7/52
[52] U.S. Cl. ............................................... 708/626
[58] Field of Search ................................... 364/758, 788

[56] References Cited

U.S. PATENT DOCUMENTS

| | | | |
|---|---|---|---|
| 4,858,168 | 8/1989 | Hwang | 364/787 |
| 4,887,233 | 12/1989 | Cash et al. | 364/757 |
| 5,012,439 | 4/1991 | Nash et al. | 364/766 |
| 5,138,570 | 8/1992 | Argade | 364/760 |
| 5,146,421 | 9/1992 | Adiletta et al. | 364/758 |
| 5,283,755 | 2/1994 | Bechade | 364/758 |
| 5,619,443 | 4/1997 | Schwarz et al. | 364/788 |

OTHER PUBLICATIONS

Paper to be submitted to CICC 1997 entitled "VLSI Implementation of a 200–MHz 16×16 Left–to–Right Carry–Free Multiplier in 0.35 um CMOS Technology for next–generation DSPs" by Ravi K. Kolagotla, et al., Lucent Technologies, Allentown, PA (4 pages).

IEEE—1993 publication entitled "nxn Carry–Save Multipliers without Final Addition" by Montuschi et al., Torino Italy, pp. 54–61.

IEEE Transactions on Computers, vol. 39, No. 11, Nov. 1990, entitled "Fast Multiplication Without Carry–Propagate Addition" by Ercegovac, et al., pp. 1385–1390.

IEEE Transactions on Computers, vol. 42, No. 10, Oct. 1993 entitled "A Reduced–Area Scheme for Carry–Select Adders" by Tyagi, pp. 1163–1170.

Quart, Journ. Mech. and Applied Math, vol. IV Pt. 2 (1951) pp. 236–240 entitled "A Signed Binary Multiplication Technique" by Andrew D. Booth.

IEEE Transactions on Computers, vol. C–36, No. 7, Jul. 1987, pp. 895–897 entitled "On–the–Fly Conversion of Redundant into Conventional Representations" by Ercegovac, et al.

Proceedings of the IRE, Jan. 1961, pp. 67–91 entitled "High–Speed Arithmetic in Binary Computers" by MacSorley.

*Primary Examiner*—David H. Malzahn
*Attorney, Agent, or Firm*—David L. Smith

[57] ABSTRACT

A multiplier generates an array of partial products. The partial products are reduced in the more significant side of the array assuming a carry-out from the less significant side of the array as taking on a first state to produce a first set of reduced products. The partial products are also reduced in the more significant side of the array assuming a carry-out from the less significant side of the array as taking on a second state to produce a second set of reduced products. Both sets of reduced partial products are generated in parallel with the carry-out from the least significant side. The first set of reduced products are selected as the reduced products of the more significant side of the array when the carry-out from the less significant side of the array takes on the first state. The second set of reduced products are selected as the reduced products of the more significant side of the array when the carry-out from the less significant side of the array takes on the second state. There is a one multiplexer delay from generation of the carry out from the less significant side until the final products are available from the more significant side.

16 Claims, 4 Drawing Sheets

$A = \overline{S+C}$
$G = S \cdot C$
$ZO = S \oplus C$
$OO = S \odot C$ $ZO = ZI \cdot \overline{G} + OI \cdot G$
$OO = ZI \cdot A + OI \cdot \overline{A}$ $A = \overline{S_{k-1} \cdot (S_k + C_k)}$
$G = S_{k-1} \cdot S_k \cdot C_k$
$ZO_k = S_k \oplus C_k$
$OO_k = S_k \odot C_k$
$ZO_{k-1} = S_{k-1} \oplus (S_k \cdot C_k)$
$OO_{k-1} = S_{k-1} \oplus (S_k + C_k)$ 5,928,317

FAST CONVERTER FOR LEFT-TO-RIGHT CARRY-FREE MULTIPLIER

This application claims the benefit of U.S. Provisional Application No. 60/034,130 filed Dec. 31, 1996.

FIELD OF THE INVENTION

This invention relates generally to multipliers and particularly to left-to-right carry-free multipliers.

BACKGROUND OF THE INVENTION

Multipliers are special purpose circuits within a microprocessor or digital signal processor used to perform the product of a multiplicand and multiplier. In a typical multiplier, partial products are formed by multiplying a binary representation (which may for example be binary, two's-complement, or one's-complement form) of the multiplicand times a binary representation of the multiplier to form a two-dimensional array of partial products. The partial products are reduced, that is added together to obtain a binary representation of the product.

The partial products may be reduced in any of several known methods. With the least significant bit (LSB) of the the multiplicand and multiplier on the right, the LSB of the product will also be on the right. The conventional way to reduce partial products is to start at the right and proceed to the left (right-to-left or LSB first) with carries being shifted, or propagated, to the left. Operations reducing partial products and carry propagation are repetitive. Reduction schemes vary in complexity from a straight-forward linear reduction to Wallace's logarithmic reduction.

In a typical right-to-left carry-save multiplier, the partial products are reduced starting at the top of the array of partial products and working toward the bottom of the array. The least significant part of the final partial-product terms are generated in binary form whereas the most significant part is generated in carry-save form. The bits in the most significant part arrive simultaneously. A carry-propagate adder is used to convert them from carry-save form to binary form to complete the multiplication operation. The delay of a fast carry-propagate adder may be a significant portion of the total multiplier delay.

Left-to-right multipliers are significantly faster than right-to-left multipliers because they do not require a carry-propagate adder for the more significant partial products to complete the multiplication process. The most significant partial product terms are available in carry-save form earlier than in conventional right-to-left multipliers. The carry and sum bits in the more significant part of the final partial products do not arrive simultaneously. They are skewed with the more significant bits arriving earlier. Left-to-right multipliers exploit this property to significantly improve the speed of the multiplier.

An example of left-to-right multiplier is disclosed in a paper entitled "Fast Multiplication Without Carry Propagate Addition" by M. D. Ercegovac and T. Lang published in the IEEE Transactions on Computers, November 1990, pages 1385–1390, the disclosure of which is hereby incorporated by reference.

The left-to-right or most significant bit first (MSB first) multiplier was extended to a full word width multiplier that produces the least significant part of the product in binary form and uses a converter to convert the most significant part from carry-save to binary form is disclosed in a paper entitled "Carry-save multiplication schemes without final addition," by L. Ciminiera and P. Montuschi published in the IEEE Transactions on Computers, September 1996, pages 1050–1055, the disclosure of which is hereby incorporated by reference. In the disclosed converter, only one of the two conditional forms described in the Ercegovac and Lang paper is used along with control signals that determine if a particular digit should be incremented. This technique requires a final stage that operates on the digit based on control signals.

Increasing clock frequencies, concomitantly shortening clock periods, necessitates increasing multiplier efficiency. While the left-to-right carry-free multiplier has improved the efficiency of multipliers by reducing hardware requirements and time of calculating a final product, there remains a need to further reduce the time required to perform a multiplication operation, such as for multiplication intense operations in digital signal processors.

SUMMARY OF THE INVENTION

In accordance with the present invention, a multiplier generates an array of partial products. The partial products are reduced in the more significant side of the array assuming a carry-out from the less significant side of the array as taking on a first state to produce a first set of reduced products. The partial products are also reduced in the more significant side of the array assuming a carry-out from the less significant side of the array as taking on a second state to produce a second set of reduced products. Because of the skew in the more significant side, both sets of reduced partial products are generated in parallel with the carry-out from the least-significant side. The first set of reduced products are selected as the reduced products of the more significant side of the array when the carry-out from the less significant side of the array takes on the first state. The second set of reduced products are selected as the reduced products of the more significant side of the array when the carry-out from the less significant side of the array takes on the second state. There is a one multiplexer delay from generation of the carry-out from the less significant side until the final products are available from the more significant side.

DETAILED DESCRIPTION

Figure 1:
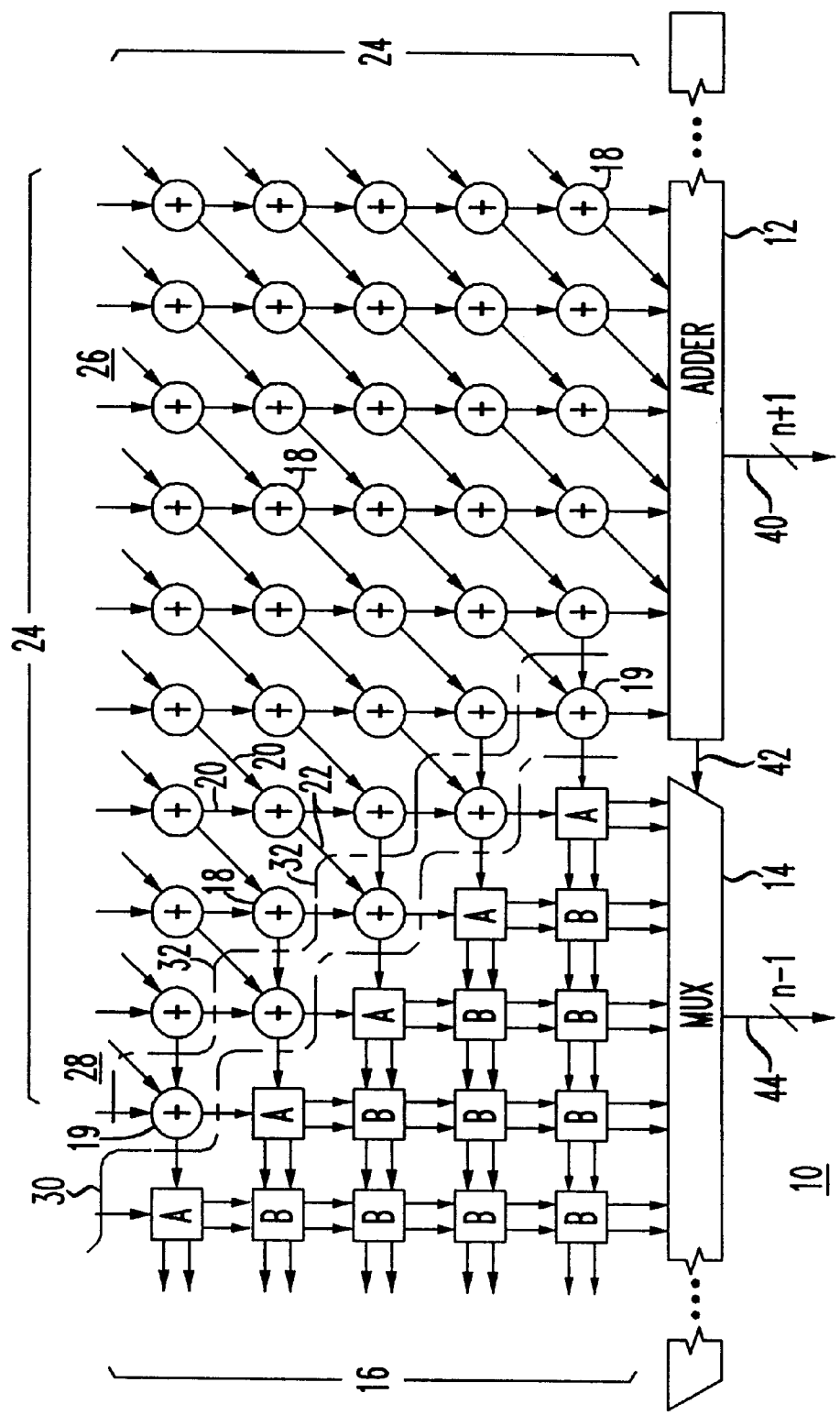
FIG. 1 is a schematic diagram of adders and a converter comprising a multiplier for producing and adding the partial product terms, and computing the product of a multiplier and multiplicand, in accordance with the present invention.
Figure 2:
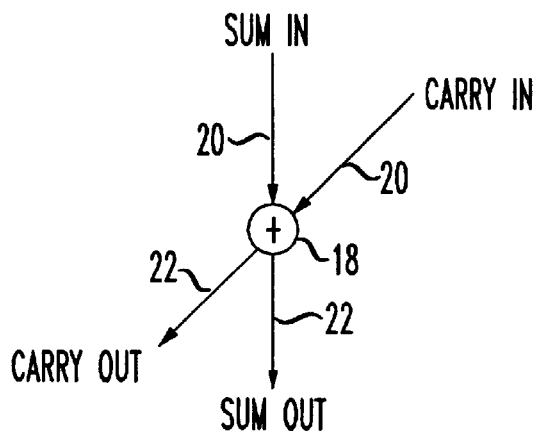
FIG. 2 is a schematic diagram of one adder cell showing the carry-in and sum-in inputs, and the carry-out and sum-out outputs.

FIG. 1 is an illustrative embodiment of a schematic diagram of a multiplier 10, which may be part of an integrated circuit. Multiplier 10 comprises carry propagate adder 12, multiplexer 14, converter 16, as well as adders 18 and 19. As is known in the art, adders 18 have inputs 20 and outputs 22 where outputs from one adder 18 may be inputs to other adders 18. Multiplier 10 is illustrated producing and adding the partial product terms, and thus computing the product of an n-bit multiplier and an n-bit multiplicand. As is known in the art, the product of an n-bit multiplicand with an n-bit multiplier results in a product having 2n bits. Adders 18 are arranged in rows and columns and may be full adders as is known in the art. Adders 18, as shown in FIG. 2, receive as inputs 20 the sum output from the adder above in the same column (when present), the carry-output in the next-lower significant column, and an implicit partial product bit, as is known in the art. Adder 18 adds the sum output, carry output and partial product bit to generate as outputs 22 a sum bit and a carry-out bit which are propagated through the array of adders as shown in FIG. 1. The more significant bit side 28 of the array 24 of adders is on the left as illustrated in FIG. 1; whereas the less significant bit side 26 of the array 24 of adders is on the right. The entire reduction array is not shown.

Each adder 18, excluding those adders 19 between broken lines 30 and 32, adds a partial product to the incoming sum and carry-out signals.

Carry propagate adder 12 receives the partial sum and carry-out signals from adders 18 in less significant side of array 24. Propagate carry-out adder 12 produces a multibit output 40 and a carry-out 42. In the illustrated embodiment, multibit output 40 is n+1 bits and carry-out 42 is one bit, although the invention is not limited thereto. Carry-out 42 provides the select input to multiplexer 14 to control the selection of multiplexer 14 outputs as will be discussed in greater detail below.

Adders 19 between broken lines 30 and 32 interface the adders 18 in array 24 with converter 16. Adders 19 do not add a partial product bit. They add together three bits from the array 24 and generate two outputs to the converter 16.

Figure 3:
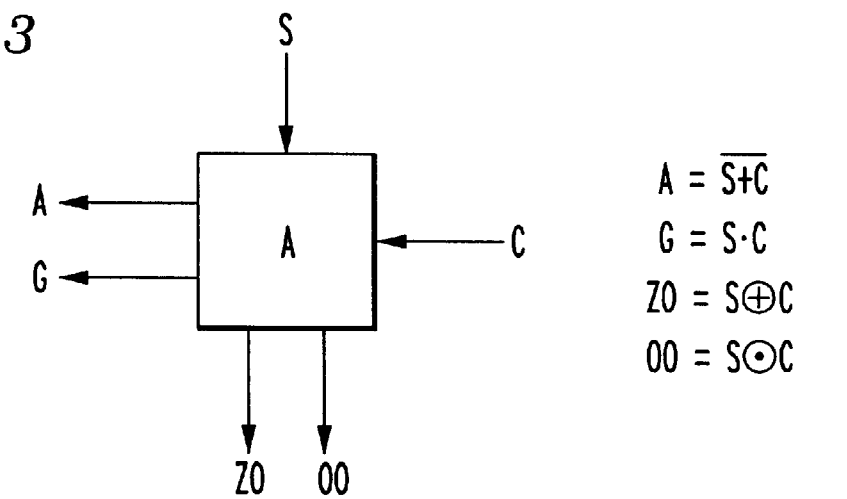
FIG. 3 is a schematic diagram of a first cell of the converter of FIG. 1.

Converter 16 is comprised of cells of two types, designated A and B. FIG. 3 is a schematic diagram of an A cell, showing the inputs S (sum) and C (carry) as well as the outputs A, G, ZO, and OO as logical combinations of the inputs. The expressions indicating how the inputs are logically combined to form the outputs is shown on the right side of FIG. 3. The symbol ⊙ is an exclusive AND.

Each A cell receives a carry-input from an adder 19 from the lower significant column between broken lines 30 and 32 in the same row. Each A cell receives a sum from an adder 18 between broken lines 30 and 32 in the same column. The reductions of the more significant bits are accomplished in the A and B cells such that the inputs to multiplexer 14 are available either prior to or simultaneously with the carry-out 42 of carry-propagate adder 12. In this manner, the sum 44 is available as the output from multiplexer 42 one multiplexer delay after the carry-out 42 from carry-propagate adder 12 is available. The skew present in generating the more significant inputs to multiplier 14 being available earlier than or simultaneously with carry-out 42, which is the select input to multiplexer 14.

Figure 4:
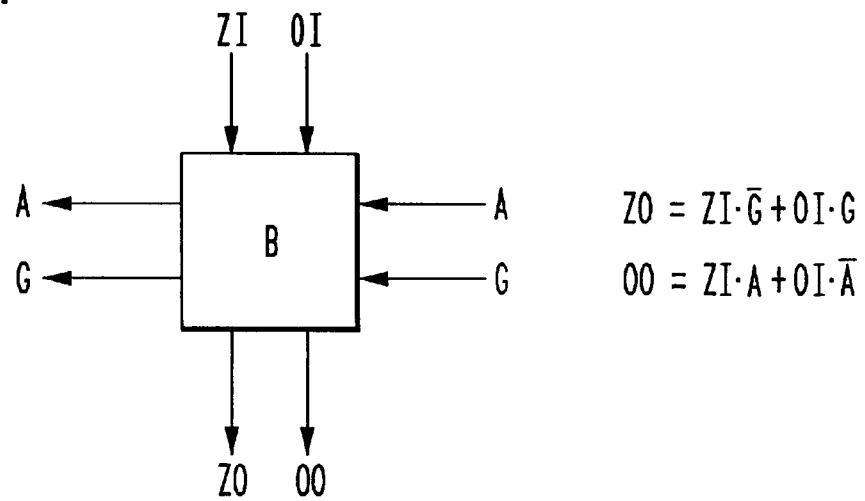
FIG. 4 is a schematic diagram of a second cell of the converter of FIG. 1.

FIG. 4 is a schematic diagram of a B cell, showing inputs ZI and OI (which are received from outputs ZO and OO of an A cell in the same column) as well as A and G received from an A cell in the same row. Each B cell passes inputs A and G to adjacent B cells (where present) and generates outputs ZO and OO. Outputs ZO and OO are logical combinations of the inputs to cell B. The expressions indicating how the inputs are logically combined to form the outputs in each B cell is shown on the side of FIG. 4.

The A and B cells, based on the logical relationship between the inputs and outputs and the interconnection architecture, compute and maintain two forms of the sum or reduced-products of the most significant bits of the product. Converter 16 computes a sum or reduced product of the most significant bits that assumes carry-out 42 from carry-propagate adder 12 will be a first logical state, such as zero. Converter 16 also computes a sum or reduced product of the most significant bits that assumes carry-out 42 from carry-out propagate adder 12 will be a second logical state, such as one. The outputs of the bottom row of A and B cells provide the two sums as inputs to multiplexer 14. One of the sums is represented by the ZO outputs; the other by the OO outputs.

When carry-propagate adder 12 has completed calculating and carry-out 42 is available, the correct one of the two sums or reduced products computed by converter 16 is selected by multiplexer 14. When carry-out 42 from carry-propagate adder 12 takes on a first state, a first sum calculated by converter 16 is selected as the output of multiplexer 14. When carry-out 42 from carry-propagate adder 12 takes on a second state, a second sum calculated by converter 16 is selected as the output of multiplexer 14. The first sum could be, for example, represented by the ZO inputs to multiplexer 14 whereas the second sum could be, for example, represented by the OO inputs to multiplexer 14.

In the illustrative embodiment, multiplexer 14 provides n−1 outputs 44 and carry-propagate adder 12 provides n+1 outputs 40 which collectively are the 2n bits of the product. The outputs 44 from multiplexer 14 are the most significant bits of the product; the outputs 42 from carry-propagate adder 12 are the least significant bits of the product. One digit is reduced between the broken lines 30 and 32 in FIG. 1. For this reason, the number of bits output from carry-propagate adder 12 is one greater than the number of bits output from multiplexer 14. A digit is log$_2$ of the radix.

The precise line of demarcation between the less significant side of array 26 and the more significant side of array 26 may vary depending on the number of bits in the multiplier and multiplicand.

Figure 5:
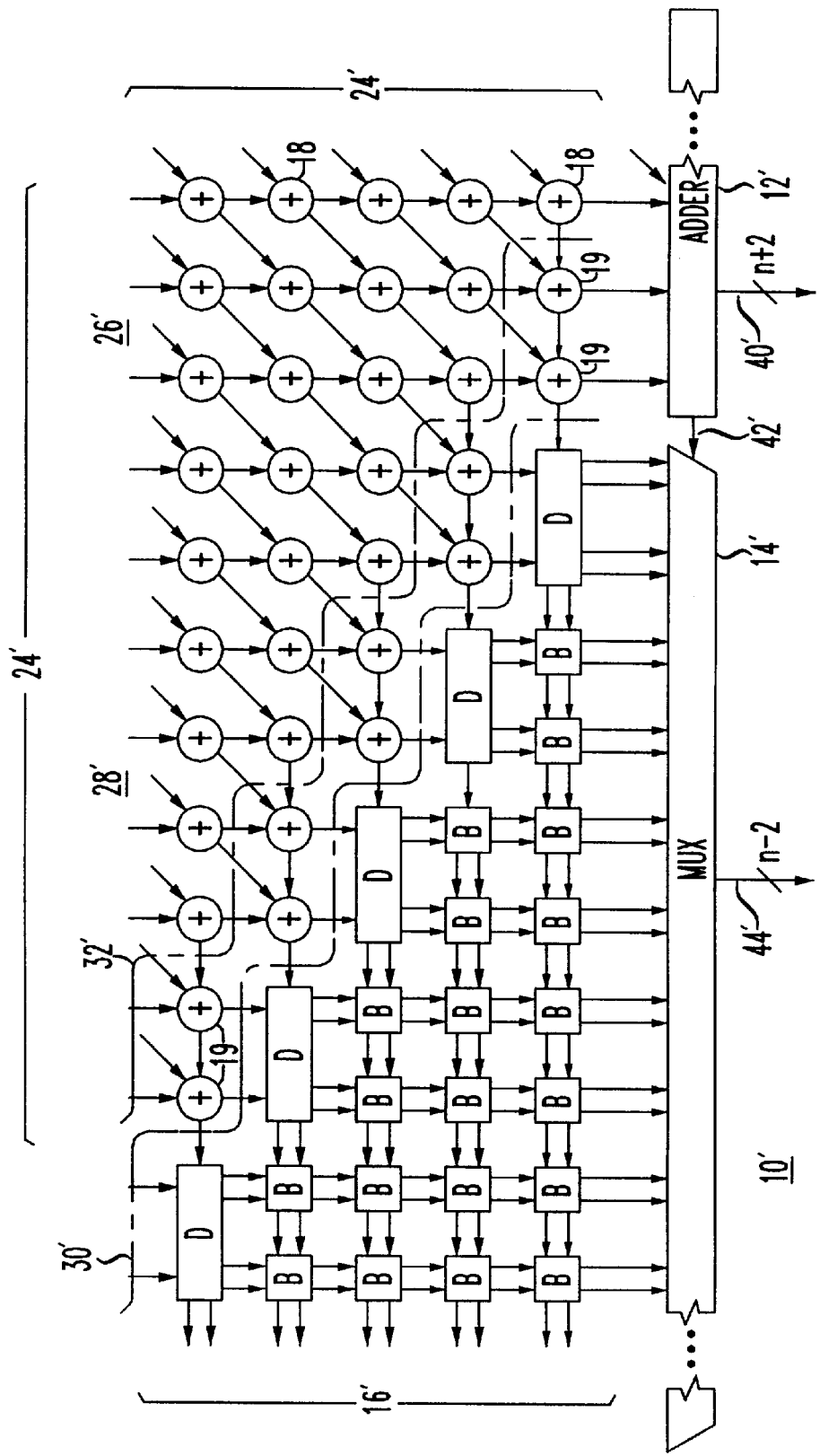
FIG. 5 is a schematic diagram of a higher radix embodiment multiplier.
Figure 6:
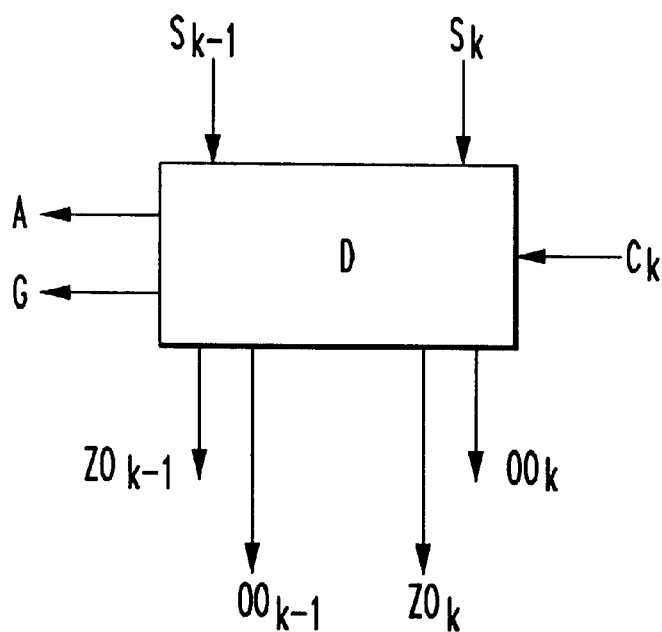
FIG. 6 is a schematic diagram of a third cell of the converter of FIG. 5.

FIG. 5 shows a schematic diagram of a converter for a radix-4 multiplier. Elements that provide a similar function to elements in the FIG. 1 embodiment are shown with the same reference numeral and a prime. In the radix-4 converter, two bits, are produced by each D-cell as compared to one bit being produced by an A cell in the converter for a radix-2 multiplier shown in FIG. 1. The number of bits output from carry-propagate adder 12' as output 40' is two greater than the number of bits output from multiplexer 14' due to one digit being reduced between broken lines 30' and 32'. The logic performed by the D cell is shown in FIG. 6. The type A cell of FIG. 1 is replaced with a type D cell in FIG. 5 due to the operands being radix-4. Although the invention is illustrated in a radix-2 embodiment in FIG. 1 and a radix-4 embodiment in FIG. 5, the invention is not limited thereto. The invention can be extended to higher radix applications.

While the illustrative embodiment has disclosed converters 16 and 16' as converting at the bit level, one skilled in the art could adapt the invention to convert groups of bits at a time.

The invention may be fabricated using known VLSI processes in one or more integrated circuits. The invention is particularly useful in communication systems and equipment employing integrated circuits including this technique. Such communications systems and equipment have the advantage of increased speed to accomplish signal processing. Multipliers in accordance with the present invention provide partial products in a manner that the more significant bits are available earlier than known multipliers, thereby reducing the time required to complete a multiplication. The invention is useful with many reduction schemes, types of multipliers, and radixes. The invention may be used with any radix-2 array multiplier such as the Baugh-Wooley-Blankenship encoded two's' complement multiplier, the Booth-MacSorley multiplier, or any higher-radix multiplier.

While the illustrative embodiment of the invention has not been described as incorporating pipelining, one skilled in the art would recognize the enhanced computation efficiently available by utilizing pipelining in the design. Pipelining is achieved by initiating computation with a new data set before completing computations with a previous set of data. The more latches used in pipelining, the greater the depth of pipelining. Pipelining causes an initial latency in computation time required to fill the pipeline, but maximizes the use of resources such as adders and multiplexers.

The invention claimed is:

1. A method of performing multiplication, comprising the steps of:
    generating an array of partial products;
    reducing the partial products in the more significant side of the array assuming a carry-out from a less significant side of the array as taking on a first state, to produce a first set of reduced products;
    reducing the partial products in the more significant side of the array assuming a carry-out from the less significant side of the array as taking on a second state, to produce a second set of reduced products;
    generating a carry-out from the less significant side of the array; and
    selecting as the reduced products of the more significant side of the array the first set of reduced products when the carry-out from the less significant side of the array takes on a first state, and the second set of reduced products when the carry-out from the less significant side of the array takes on a second state.

2. The method of performing multiplication as recited in claim 1, further comprising the step of:
    reducing the partial products in the less significant side of the array to produce a carry-out.

3. The method of performing multiplication as recited in claim 2, wherein the step of reducing the partial products in the less significant side of the array further comprises producing a sum of the partial products in the least significant side of the array.

4. The method of performing multiplication as recited in claim 1, wherein the selecting occurs at the bit level.

5. The method of performing multiplication as recited in claim 1, wherein the selecting occurs at the level of a group of bits.

6. The method of performing multiplication as recited in claim 1, wherein the reduced partial products from the more significant side of the array are available prior to reduced partial products from the less significant side of the array.

7. The method of performing multiplication as recited in claim 1, wherein the reduced partial products from the more significant side of the array are available at substantially the same time as reduced partial products from the less significant side of the array.

8. The method of performing multiplication as recited in claim 1, wherein the step of reducing the partial products in the most significant side of the array further comprises
    reducing from left-to-right the partial products in the most significant side of the array such that the more significant bits arrive earlier than the less significant bits.

9. A method of performing multiplication, comprising the steps of
    generating an array of partial products;
    reducing the partial products in a more significant side of the array in a hierarchal carry-select adder;
    generating a carry from a less significant side of the array; and
    selecting the sum of the reduced partial products based on a carry received from a less significant side of the array.

10. A multiplier, comprising
    a first circuit for reducing partial products in a more significant side of a partial products array to produce a first set of reduced products, the first circuit receiving a carry-in that is a first state;
    a second circuit for reducing partial products in the more significant side of a partial products array to produce a second set of reduced products, the second circuit receiving a carry-in that is a second state;
    an adder for reducing partial products in a less significant side of the array, the adder generating a carry-out; and
    a selector for selecting as the reduced products of the more significant side of the array the first set of reduced products when a carry-out from a less significant side of the array takes on a first state, and for selecting as the reduced products of the more significant side of the array the second set of reduced products when a carry-out from the less significant side of the array takes on a second state.

11. The multiplier as recited in claim 10, further comprising:
    a circuit for reducing partial products in the less significant side of the array to produce a carry-out.

12. The multiplier as recited in claim 11, wherein the circuit also provides reduced partial products of the less significant side of the array.

13. An integrated circuit, comprising
    a multiplier circuit for producing the product of a multiplicand and a multiplier, the multiplier circuit comprising:
    a first circuit for reducing partial products in a most significant side of a partial products array to produce a first set of reduced products, the first circuit receiving a carry-in that is a first state;
    a second circuit for reducing partial products in the most significant side of a partial products array to produce a second set of reduced products, the second circuit receiving a carry-in that is a second state;
    a selector for selecting as the reduced products of the most significant side of the array the first set of reduced products when a carry-out from a less significant side of the array takes on a first state, and second set of reduced products when a carry-out from the least significant side of the array takes on a second state.

14. The integrated circuit as recited in claim 13, further comprising:
    a circuit for reducing partial products in the less significant side of the array to produce a carry-out.

15. The integrated circuit as recited in claim 14, wherein the circuit also provides reduced partial products of the less significant side of the array.

16. The integrated circuit as recited in claim 13, wherein the integrated circuit is a digital signal processor.

* * * * *